(12) United States Patent
Choate (10) Patent No.: US 10,125,881 B2
(45) Date of Patent: Nov. 13, 2018

(54) SAFETY VALVE (71) Applicant: Jeremy R. Choate, Carencro, LA (US)

(72) Inventor: Jeremy R. Choate, Carencro, LA (US)

( * ) Notice: Subject to any disclaimer, the term of this patent is extended or adjusted under 35 U.S.C. 154(b) by 350 days.

(21) Appl. No.: 15/138,928

(22) Filed: Apr. 26, 2016

(65) Prior Publication Data

US 2017/0307094 A1    Oct. 26, 2017

(51) Int. Cl.
*F16K 17/04* (2006.01)
*F16K 17/06* (2006.01)

(52) U.S. Cl.
CPC .......... *F16K 17/06* (2013.01); *F16K 17/0413* (2013.01)

(58) Field of Classification Search
CPC .. F16K 17/0413; F16K 17/0433; F16K 17/06; F16K 17/08; F16K 17/087; Y10T 137/7744; Y10T 137/7745; Y10T 137/7746; Y10T 137/7747
See application file for complete search history.

(56) References Cited

U.S. PATENT DOCUMENTS

| | | | | |
|---|---|---|---|---|
| 1,696,452 A | * | 12/1928 | Raymond | F16K 17/10 137/476 |
| 2,597,057 A | * | 5/1952 | Bergquist | F16K 17/0433 137/470 |
| 3,411,530 A | * | 11/1968 | Powell | F16K 17/0433 137/454.6 |
| 3,520,326 A | * | 7/1970 | Bowen | F16K 17/0433 137/477 |
| 3,848,632 A | * | 11/1974 | Powell | F16K 17/0433 137/514 |
| 5,046,524 A | * | 9/1991 | Crichton, Jr. | F16K 17/08 137/478 |
| 5,341,838 A | * | 8/1994 | Powell | F16K 17/0433 137/478 |

* cited by examiner

*Primary Examiner* — Ryan A Reis (57) ABSTRACT

An adjustable blowdown safety valve is provided for use on a pressure vessel or a flow line with a pressurized fluid therein. In the preferred embodiment, the adjustable blowdown safety valve comprises a body with a closed bonnet and a chamber therein and an inlet and an outlet; the inlet including a valve seat; a disk member with an attached stem member closable on the valve seat; a mechanism in the body biasing the disk member to rest on the valve seat; a guide member supported in the bonnet to guide and limit disk member movement; and a skirt member affixed to the body, which surrounds the disk member and defines a uniform flow area in combination with a blowdown ring. The presented adjustable blowdown safety valve has improvements, which remove detriments to disk member movement, resulting in an adjustable blowdown safety valve with predictable performance and improved reliability.

10 Claims, 8 Drawing Sheets

PRIOR ART

SAFETY VALVE

BACKGROUND

The present invention relates to adjustable blowdown safety valves for use with gases on a pressurized system, such as pressure vessel or a flow line. Adjustable blowdown safety valves are commonly used on pressure vessels or pipelines to relieve temporary pressure surges in excess of the safe pressure the vessel or pipeline can withstand. Adjustable blowdown safety valves have the advantage of responding very quickly to pressure changes in pressurized systems to which they are attached. Adjustable blowdown safety valves move to a fully open position almost immediately after the pressure within the system rises above a user-determined set pressure. This allows excess fluid pressure to escape quickly. Then, when sufficient pressure has escaped, adjustable blowdown safety valves quickly move back to a closed position. For an example of an adjustable blowdown safety valve, see U.S. Pat. No. 3,572,372, which is herein incorporated by reference in its entirety.

The term "blowdown" refers to the percentage difference between the user determined set pressure and the pressure in the pressure vessel or flow line when the safety valve snaps closed. For example, if a user sets the set pressure at 100 psi, the safety valve stays open as gas escapes out of the safety valve until the pressure in the pressure vessel or flow line is 90 psi, then this safety valve has a blowdown value of 10%. Safety valves having a means to adjust the blowdown value while maintaining a constant set pressure are referred to as adjustable blowdown safety valves. Adjustable blowdown safety valves are desirable because they typically have low blowdown values of 5-15%, which minimizes the amount of gas that is lost from the pressurized system into the atmosphere during venting, thereby addressing environmental concerns. Safety valves not having a means to adjust the blowdown value while maintaining a constant set pressure are referred to as fixed blowdown safety valves. Fixed blowdown safety valves typically have blowdown values of 30-50%.

Existing adjustable blowdown safety valves do, however, have some problems. One problem with existing adjustable blowdown safety valves is that they tend to utilize a design where disk member lift is susceptible to change because of debris buildup on the lift stop. See, for example, the adjustable blowdown safety valves described in U.S. Pat. No. 3,411,530 (hereinafter the '530 patent), which is herein incorporated by reference in its entirety, and U.S. Pat. No. 5,341,838 (hereinafter the '838 patent), which is herein incorporated by reference in its entirety. In the '530 and '838 patents, as the disk member lifts off the inlet, fluid is directed around the outer diameter of the disk member towards the backside of the disk member. In the '530 patent, disk member lift is limited by a cage member. In the '838 patent, disk member lift is limited by an internal shoulder on the bonnet. Any build-up of foreign particles from contaminated fluids in designs utilizing these types of disk member stops can shorten disk member travel or interfere with disk member movement, which makes valve performance less reliable.

Another problem with existing adjustable blowdown safety valves is that they tend to utilize a design where the disk member outer diameter travels directly over areas in the direct path of flow from the inlet. In the '530 and '838 patents, the lower section of the outer diameter of the disk member overlaps the inlet throughout valve cycling. In the '530 patent, as the disk member lifts off the inlet, fluid is directed towards the inner diameter of the cage. In the '838 patent, as the disk member lifts off the inlet, fluid is directed towards the inner diameter of the bonnet. Any build-up of foreign particles from contaminated fluids coming from the inlet on the close fit surfaces can interfere with disk member movement, which makes valve performance less predictable.

In addition to the above-mentioned problems, adjustable blowdown safety valves can vary in quality in a number of ways. Different adjustable blowdown safety valves vary in their ability to attain high coefficients of flow, their performance reliability, their durability, their cost to manufacture, and their ease of use.

SUMMARY OF THE INVENTION

An adjustable blowdown safety valve has been invented that addresses problems left unsolved by prior valves. Namely, an adjustable blowdown safety valve has been invented that incorporates components in the design to limit disk member lift while providing reliable disk member movement without reliance on a disk member lift stop located in the path of flow. Also, an adjustable blowdown safety valve has been invented that incorporates components in the design where the disk member outer diameter does not travel directly over areas in the direct path of flow from the inlet. The resulting adjustable blowdown safety valve has improved reliability in disk member movement and function, which makes valve performance more predictable. Disk member cycle life is increased, which extends the service life of the adjustable blowdown safety valve and leads to a decreased need for valve maintenance and repair.

It has been discovered that an adjustable blowdown safety valve utilizing a valve housing with a closed bonnet, chamber, an outlet, a disk member with an attached stem member, a guide member with a longitudinal guide bore, a fixed skirt member, an inlet base, and a blowdown adjustment ring, can create an adjustable blowdown safety valve utilizing a preferable means to control disk member lift and limit flow induced interference with disk member movement during valve cycling.

In the improved adjustable blowdown safety valve, as the disk member is removed from a valve seat, fluid flows from the valve inlet around the outer diameter of the disk member and into the closed bonnet within the valve housing. Disk member lift is controlled by a guide member with a longitudinal guide bore, which accepts a stem member attached to the disk member. Fluid pressure builds in the bonnet and then flows from the bonnet and around the disk member outer diameter and through a uniform annular area of flow defined by the skirt member and the blowdown adjustment ring. Fluid then flows into a chamber in the lower valve housing and exits through the outlet. The guide member used as a disk member lift stop is located away from any path of flow, and the disk member outer diameter does not travel directly over any close fit areas in the direct path of flow from the inlet. The present invention provides measurable improvement over the valves of the '530 and '838 patents.

In one aspect of the invention, an improved adjustable blowdown safety valve designed for use on a pressure vessel or a flow line with a pressurized fluid therein is provided. The adjustable blowdown safety valve includes a valve body attachable to the pressure vessel or flow line, the valve body comprising an inlet base with an inlet, a housing with an outlet, a closed bonnet within the housing with an attached guide member with a guide bore therein. The adjustable blowdown safety valve also includes a disk member closable on a valve seat between the inlet and the disk member, and a stem member attached to the disk member. Further, the adjustable blowdown safety valve includes a mechanism in the body biasing the disk member to rest on the valve seat with a set force, such that when the pressure in the pressure vessel or flow line exceeds a set pressure resulting from the set force, the disk member is lifted from the valve seat. The adjustable blowdown safety valve includes a fixed skirt member that defines a uniform annular area of flow with an adjustable blowdown ring attached to the inlet base. An improvement on the valve comprises the use of a guide member with a longitudinal guide bore as a disk member lift stop located away from any path of flow on an adjustable blowdown safety valve.

In a second aspect of the invention, an improved adjustable blowdown safety valve is provided. The adjustable blowdown safety valve has a valve body comprised of an inlet base with an inlet and a housing with an outlet, a closed bonnet and a chamber within the housing, a disk member with an attached stem member closable on a valve seat between the inlet and the disk member, a mechanism biasing the disk member on the valve seat, a guide member with a longitudinal guide bore attached to the housing, and a fixed skirt member. An improvement on the valve comprises the use of the skirt member, inlet base, and guide member in combination with a disk member with a restricted annular passage located around the outer diameter of the disk member. The skirt member defines a uniform annular area of flow with an adjustable blowdown ring on the inlet base through which fluid does pass after the disk member is fully removed from the valve seat. Use of a restricted annular passage around the outer diameter of the disk member lends itself to adjustable blowdown, and it enables pressure on the back side of the disk member to be delayed in communication to the space on the front side of the disk member as the disk member begins closing movement towards the valve seat. Pressure does build on the backside of the disk member to assist in disk member closure on the inlet. Since the disk member outer diameter is located away from the main path of flow, the disk member outer diameter does not come into contact with the skirt area located in the main flow path. Contact with debris coating the skirt from the main flow path is eliminated. Disk member freeze-up is avoided, and the amount of pressure necessary to open the valve is unaffected, making valve performance more predictable. The present invention provides measurable improvement over the valves of the '530 and '838 patents.

The present invention provides the foregoing and other features; the advantage of the invention over prior art valves does become further apparent from the following detailed description of the embodiments, read in conjunction with the accompanying drawings. The detailed description and drawings are merely illustrative of the invention and do not limit the scope of the invention, which is defined by the appended claims and equivalents thereof.

DETAILED DESCRIPTION OF THE DRAWINGS AND OF THE EMBODIMENTS OF THE INVENTION

Figure 1:
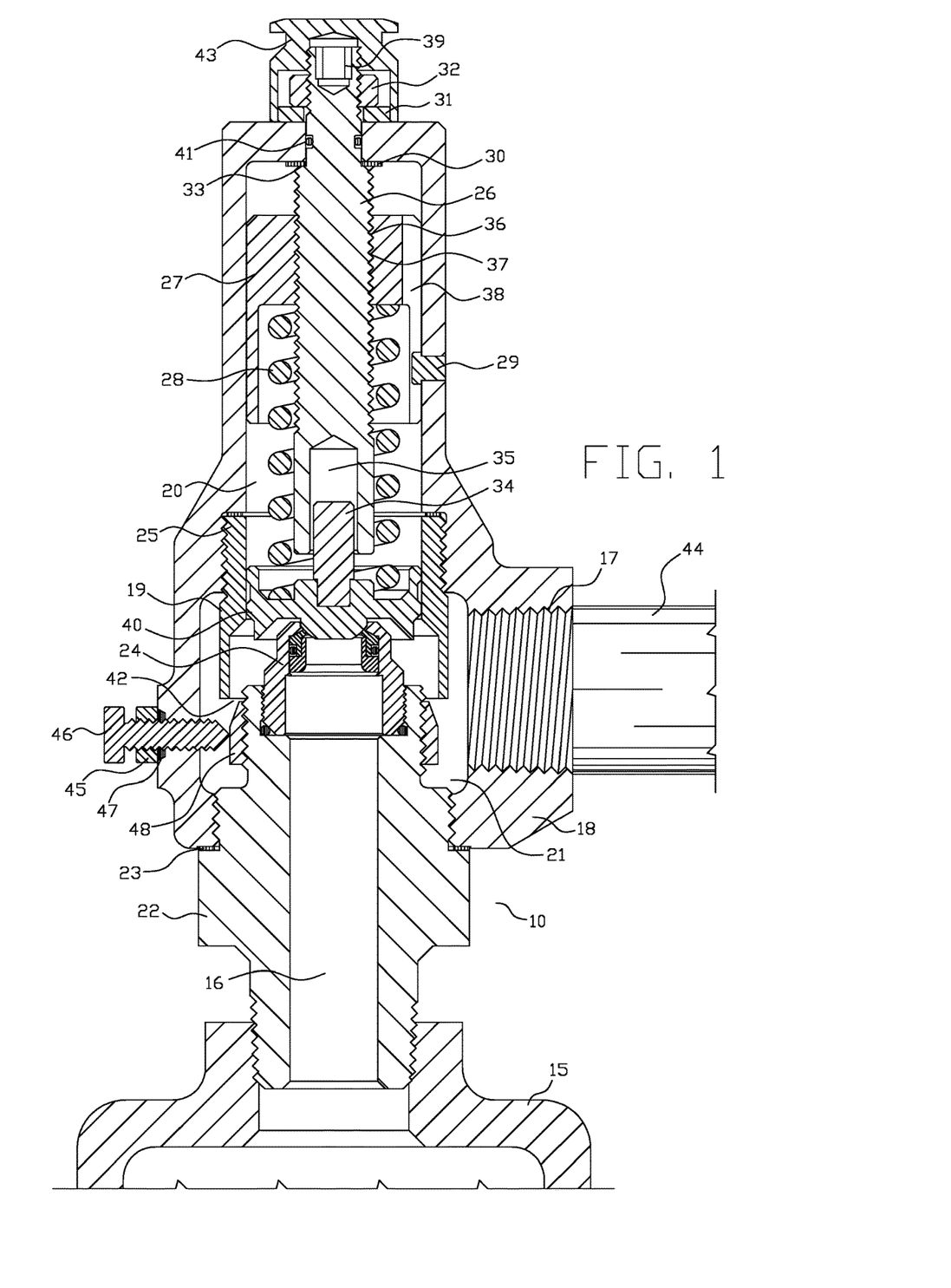
FIG. 1 is a cross-sectional view of a first embodiment of an adjustable blowdown safety valve in a closed position.

Referring to FIG. 1, an adjustable blowdown safety valve 10 is shown in a closed position. The adjustable blowdown safety valve 10 is removably affixed to a pressure vessel 15. Any method known in the art can be used to removably affix the adjustable blowdown safety valve 10 to the pressure vessel 15. Preferably, a threaded engagement is used. Nuts, bolts, screws, adhesives, and friction fitting may also be used.

The adjustable blowdown safety valve 10 has a valve body made of two parts, an inlet base 22 and a housing 18. A soft metal washer 23 is placed between the inlet base 22 and the housing 18 to seal the connection as the parts are screwed together. The inlet base 22 has male threads on its bottom so that the adjustable blowdown safety valve 10 can be threaded onto the pressure vessel 15. The inlet base 22 has an inlet 16 through which fluids pass from the pressure vessel 15 into the housing 18. The housing 18 defines a bonnet 20 therein, a chamber 21 therein, and an outlet 17. The outlet 17 has female threads to which a pipe 44 can be attached for conveying fluids discharged through the valve. Preferably, the steel that is used in the inlet base 22 and housing 18 is one or more of commercially available mild steel, stainless steel, carbon steel, or combinations thereof. The material for a particular pressure relief valve 10 may be selected based upon what the adjustable blowdown safety valve 10 is used for, in particular, which fluid is flowing through the adjustable blowdown safety valve 10.

Downstream from and associated with the inlet 16 is a valve seat 24, made up of several components. In the closed position, a disk member 40 removably rests upon the valve seat 24. The disk member 40 includes a sealing surface with the shape of a section of a sphere. Preferably, the disk member 40 is made of steel. Preferably, the steel that is used in the disk member 40 is one or more of commercially available mild steel, stainless steel, carbon steel, and combinations thereof. Generally, these types of disk member 40 and valve seat 24 arrangements are preferred because they provide a reliable valve seal after repeated valve cycling.

When the disk member 40 rests on the valve seat 24, fluid cannot escape from the pressure vessel 15, through the inlet 16, and pass the valve seat 24. The disk member 40 rests on valve seat 24 in the closed position because a user has adjusted a mechanism to bias the disk member 40 to stay closed on the valve seat 24. Preferably, the mechanism is a guide screw 26, which acts, directly or indirectly, against a spring 28 to hold the disk member 40 on the valve seat 24. For example, in FIG. 1, the guide screw 26 is supported on a bearing 30, which contacts the top of the housing 18. A hexagonal hole 39 is provided to enable rotation of the guide screw 26. An o-ring 41 provides a seal between the housing 18 and the guide screw 26. The guide screw 26 has a shoulder 33 contacting the bearing 30. The shoulder 33 prevents the guide screw 26 from traveling longitudinally upward inside the housing 18. The force exerted by the spring 28 is transferred to a bushing 27 and onto the guide screw 26, which keeps the shoulder 33 against the bearing 30, and prevents the guide screw 26 from moving longitudinally downward. The bushing 27 is inside the housing 18 and rides up and down on the guide screw 26 as bushing threads 36 engage guide screw threads 37. To prevent the bushing 27 from rotating, the bushing 27 has an axial slot 38 located on its outer diameter through which a pin member 29 extends. The pin member 29 is rigidly attached to the housing 18 by an interference fit. Thus, the guide screw 26 is supported in the housing 18 to allow rotational, but not longitudinal movement. A nut 32 and a washer 31 are used to lock the rotational position of the guide screw 26. A cap 43 is used to protect the threaded upper section of the guide screw 26 from external damage.

The amount of force that the guide screw 26, the bushing 27, and the spring 28 apply against the disk member 40 produces a set pressure. Although the guide screw 26 and the spring 28 are preferred, the set pressure can be adjusted using any mechanism known in the art.

The guide screw 26 is particularly preferred because it has a longitudinal bore 35 therein. When the disk member 40 is removed from the valve seat 24, the bore 35 provides a path of movement for a stem member 34 permanently affixed to the disk member 40. The stem member 34 is attached to the disk member 40 by an interference fit, but any mechanism known in the art can be used. The guide screw 26 and disk member 40 arrangement minimizes the possibility of debris buildup and contamination of moving parts during fluid flow out of the adjustable blowdown safety valve 10.

When the pressure inside the pressure vessel 15 exceeds the valve set pressure, the adjustable blowdown safety valve 10 opens. Specifically, fluid comes through the inlet 16, past the valve seat 24, and applies an upward force to the disk member 40. When the upward force exceeds the down forces acting on the disk member 40, including the set pressure, the disk member 40 is lifted from the valve seat 24 and guided upward. Note that the upward/downward language is used to describe the orientation of embodiment of the pressure relief valve 10 shown in FIG. 1. The adjustable blowdown safety valve 10 could be designed so that the disk member 40 moved horizontally rather than vertically, or in another direction. When the disk member 40 is lifted from the valve seat 24, fluid escapes from the inlet 16, passes around the outer diameter of the disk member 40, and flows into the bonnet 20. When the disk member 40 is fully lifted against the guide screw 26, fluid flows from the bonnet 20, past the disk member 40, through a uniform annular area of flow 42 defined by a blowdown ring 48 attached to the inlet base 22 and a skirt member 19, into the chamber 21 of the housing 18, and is exhausted out of the outlet 17.

The skirt member 19 is preferably made of steel. Preferably, the steel that is used in the skirt member is one or more of commercially available mild steel, stainless steel, carbon steel, and combinations thereof. The skirt member 19 is attached to the housing 18 of the adjustable blowdown safety valve 10 by a threaded engagement, but any mechanism known in the art, including friction fitting or the application of adhesive substances can be used to attach the skirt member 19. A soft metal washer 25 is placed between the housing 18 and the skirt member 19 to create a seal for the connection.

In FIG. 1, the skirt member 19 is attached to the housing 18 and creates a uniform annular area of flow 42 between the skirt member 19 and the blowdown ring 48 attached to the inlet base 22. The uniform annular area of flow 42 size is determined by the dimensions of the skirt member 19 and blowdown ring 48, so that built-up back pressure in the bonnet 20 does not adversely affect flow coming from the inlet 16. Those of ordinary skill in the art understand the limitations imposed by built-up back pressure for a particular adjustable blowdown safety valve 10. The external surface of the inlet base 22 is provided with threads, and a blowdown ring 48 is threaded on it. The blowdown ring 48 is locked in position by a threaded lock screw 46 connected to the body 18 which prevents the blowdown ring 48 from moving during valve operation. A lock screw nut 45 and lock screw thread seal 47 are also provided on the lock screw 46. The position of the blowdown ring 48 controls the size of the uniform annular area of flow 42. The blowdown ring 48 has a tapered exterior to provide a means of streamlining fluid flow into the chamber 21. The blowdown ring 48 is moved upward or downward to narrow or widen the size of the uniform annular area of flow 42. The uniform annular area of flow 42 and blowdown ring 48 cooperate with the dimensions and capacity of the bonnet 20 to vary bonnet pressure, and in turn, control blowdown. Bonnet pressure changes control the manner in which the disk member 40 moves within the skirt member 19. Bonnet pressure controlled by the area of space between the blowdown ring 48 and the skirt member 19, controls opening and closing characteristics of the adjustable blowdown safety valve 10.

Specified service conditions include, but are not limited to the fluid being relieved through the adjustable blowdown safety valve 10, the temperature at which the adjustable blowdown safety valve 10 is run, the maximum pressure of the pressure vessel 15 to which the adjustable blowdown safety valve 10 is attached (which is related to the set pressure), the size of the inlet 16 and the outlet 17, the material of the inlet base 22, the material of the valve seat 24, the maximum flow capacity of the adjustable blowdown safety valve 10, the length of piping 44 attached to the outlet 17, etc. Those of ordinary skill in the art understand the various specified service conditions for a particular adjustable blowdown safety valve 10.

For example, a fluid used in a typical installation might be air, water, carbon dioxide, propane, or another fluid. Temperature during operation of the adjustable blowdown safety valve 10 may be 100 degrees Fahrenheit at the seat 24 and 70 degrees Fahrenheit at the outlet 17. A typical set pressure might be 200 psig.

For a particular installation, certain operating conditions may involve ranges. For example, the adjustable blowdown safety valve 10 may be specified to operate at any temperature within a range of temperatures. Often, the valve manufacturer specifies ranges of operating conditions for which their valves are designed.

Figure 2:
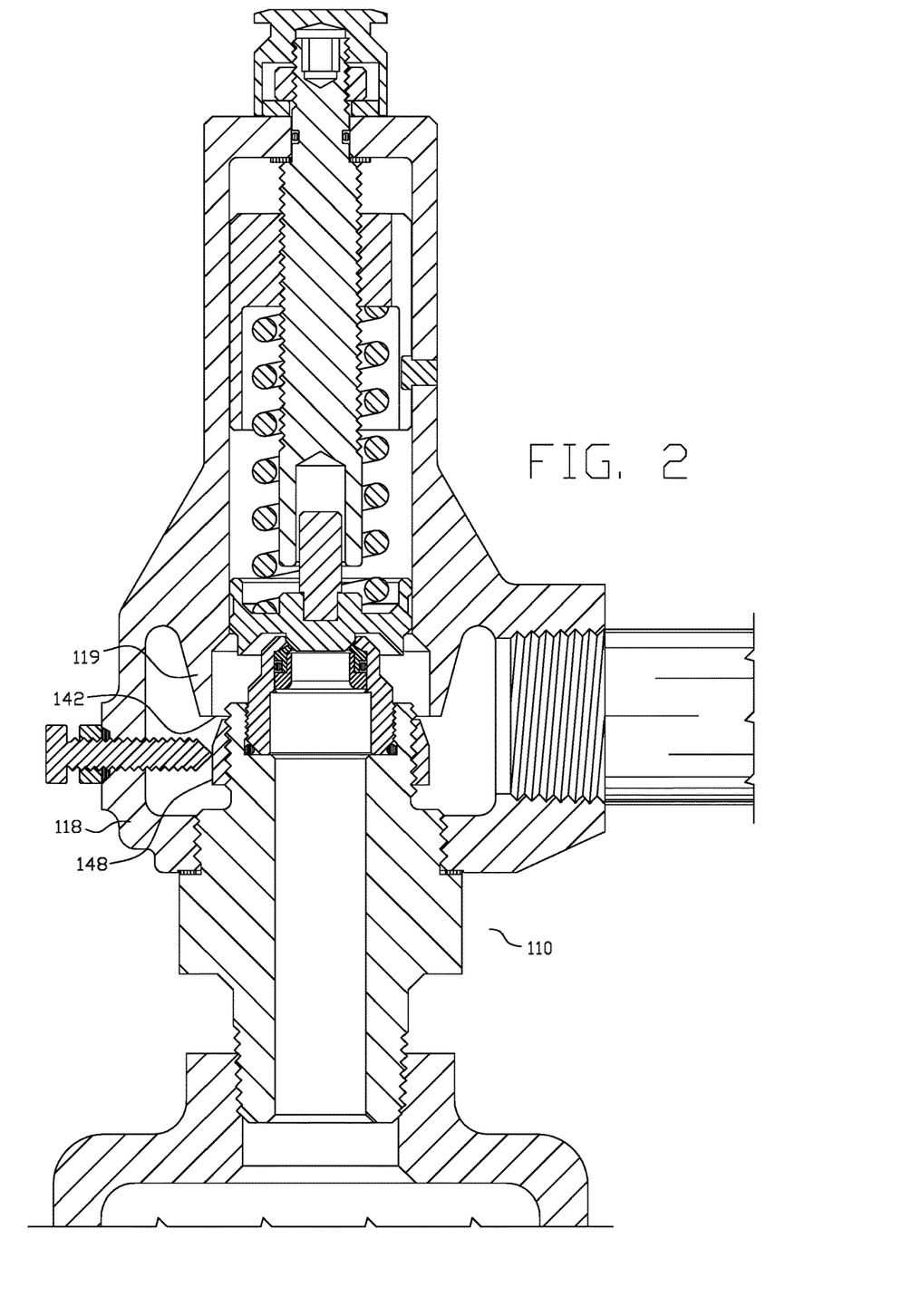
FIG. 2 is a cross-sectional view of a second embodiment of an adjustable blowdown safety valve in a closed position.

Referring to FIG. 2, another embodiment of an adjustable blowdown safety valve 110 is shown. The adjustable blowdown safety valve 110 is substantially identical to the adjustable blowdown safety valve 10 in FIG. 1, except the adjustable blowdown safety valve 110 uses a housing 118 with an integral skirt 119 to create a uniform annular area of flow 142 with a blowdown ring 148.

Figure 3:
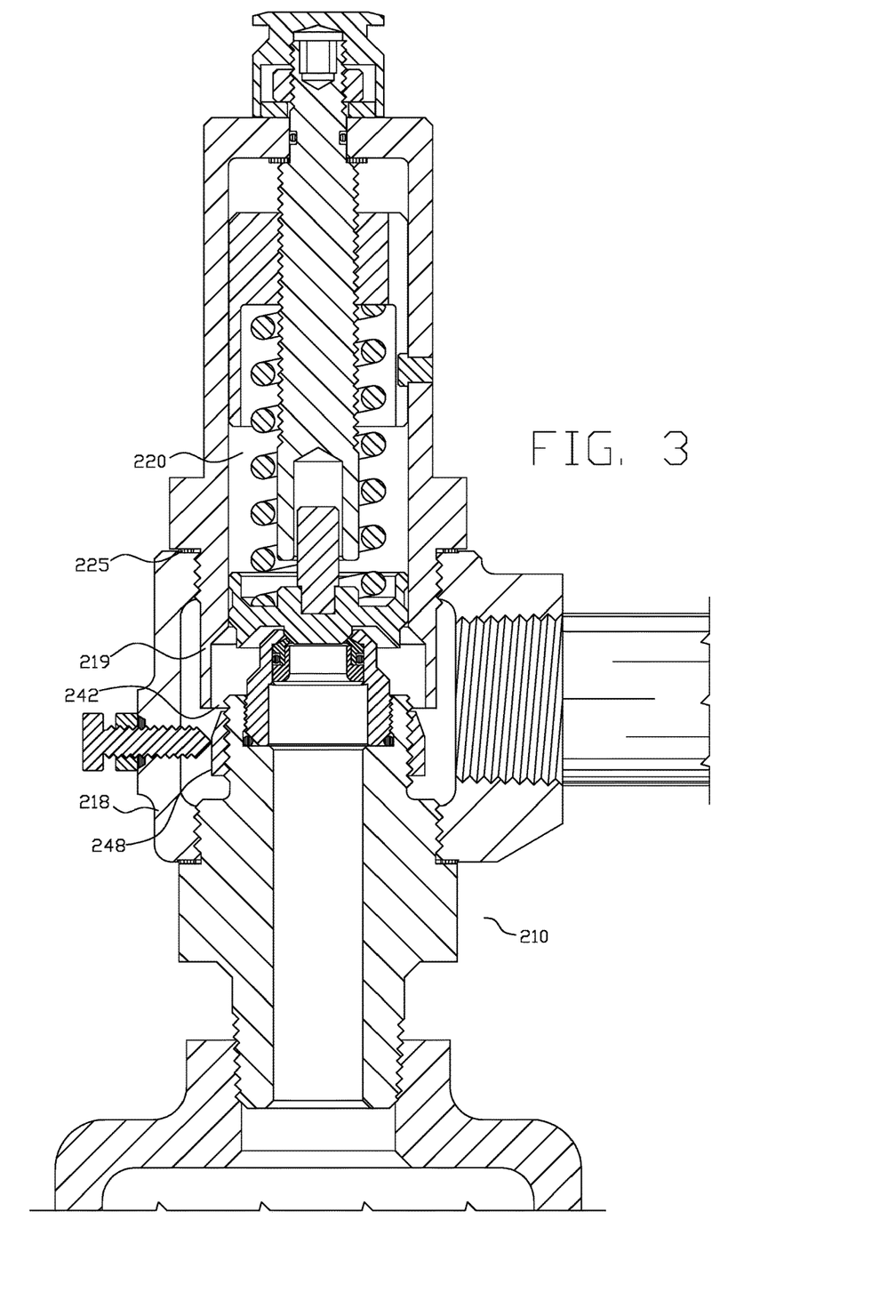
FIG. 3 is a cross-sectional view of a third embodiment of an adjustable blowdown safety valve in a closed position.

Referring to FIG. 3, another embodiment of an adjustable blowdown safety valve 210 is shown. The adjustable blowdown safety valve 210 is substantially identical to the adjustable blowdown safety valve 10 in FIG. 1, except the adjustable blowdown safety valve 210 uses a bonnet 220 with an integral skirt 219, which is screwed onto a housing 218, to create a uniform annular area of flow 242 with a blowdown ring 248. The adjustable blowdown safety valve 210 uses a soft metal washer 225 to provide a seal between the bonnet 220 and the housing 218.

Figure 4:
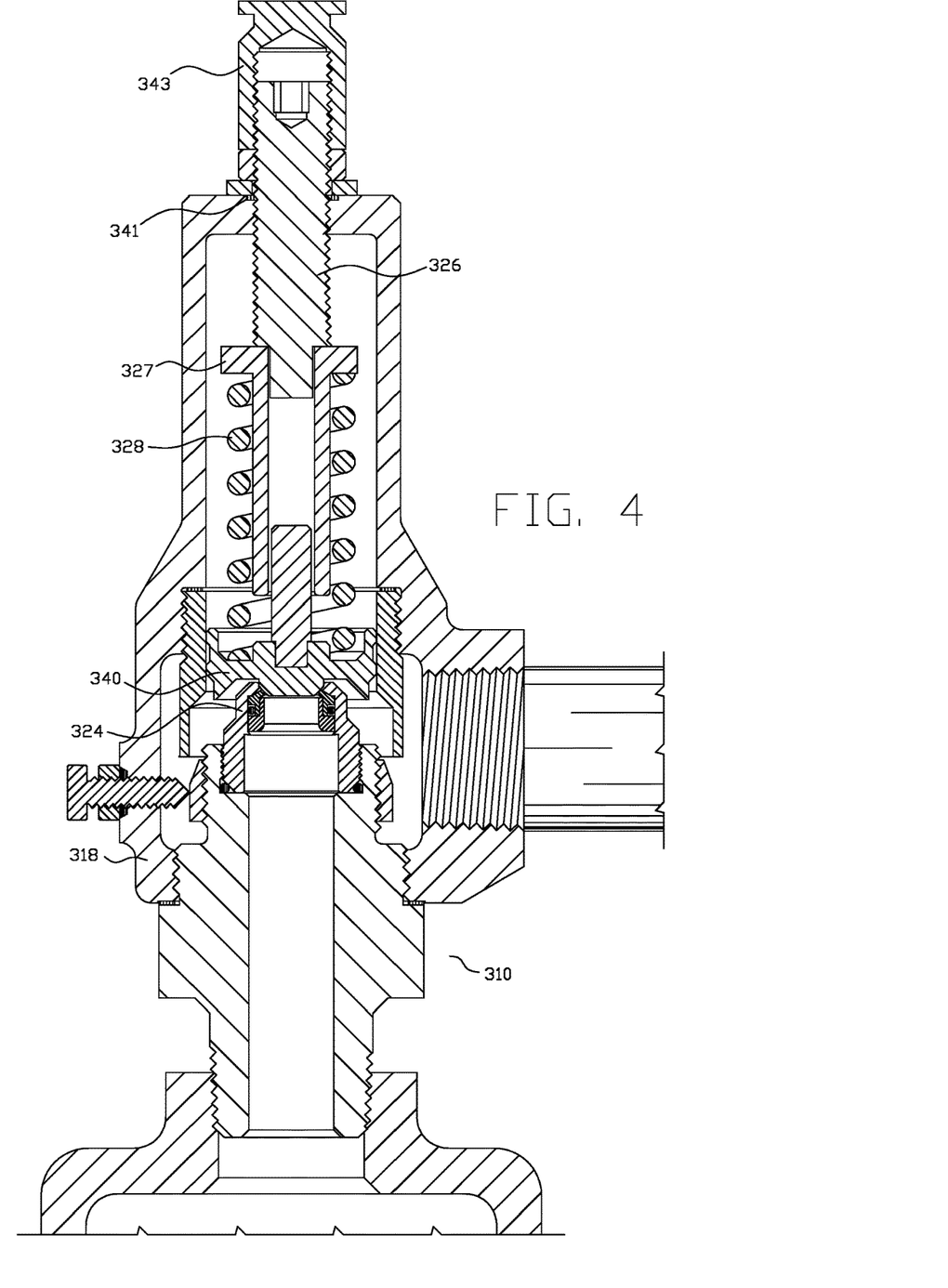
FIG. 4 is a cross-sectional view of a fourth embodiment of an adjustable blowdown safety valve in a closed position.

Referring to FIG. 4, another embodiment of an adjustable blowdown safety valve 310 is shown. The adjustable blowdown safety valve 310 is substantially identical to the adjustable blowdown safety valve 10 in FIG. 1, except the adjustable blowdown safety valve 310 utilizes a different disk member guidance arrangement. The adjustable blowdown safety valve 310 has a set screw 326 threaded onto a housing 318 with an attached guide member 327, a thread seal 341, and a cap 343. The set pressure is adjusted by rotating the set screw 326, which moves the guide member 327 longitudinally upward and downward inside the housing 318, which results in changing the amount of compression on a spring 328, which acts on a disk member 340 to close on a valve seat 324.

Figure 5:
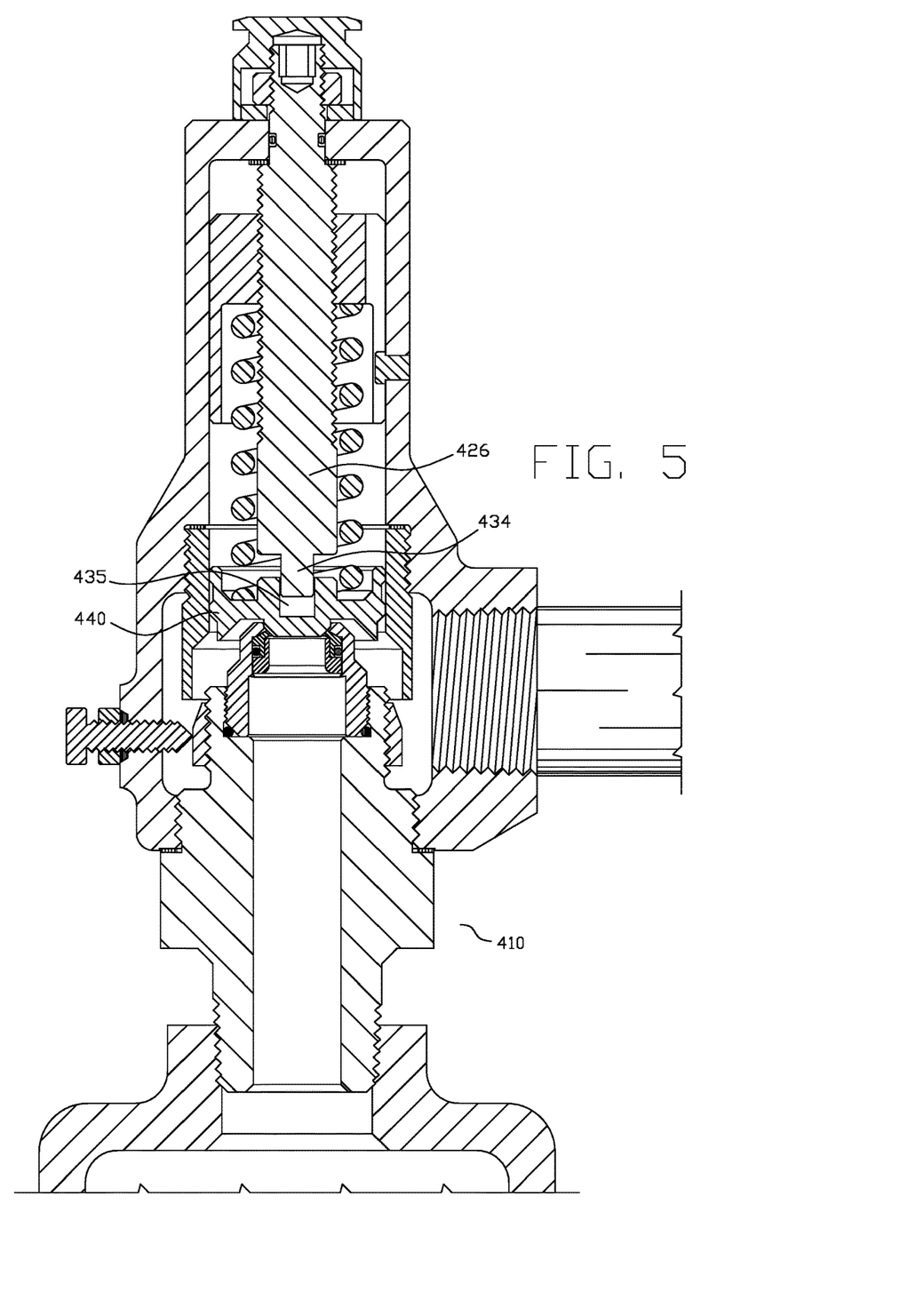
FIG. 5 is a cross-sectional view of a fifth embodiment of an adjustable blowdown safety valve in a closed position.

Referring to FIG. 5, another embodiment of an adjustable blowdown safety valve 410 is shown. The adjustable blowdown safety valve 410 is substantially identical to the adjustable blowdown safety valve 10 in FIG. 1, except the adjustable blowdown safety valve 410 utilizes a different disk member guidance arrangement. A disk member 440 has a longitudinal bore 435 machined on the back side, which accepts a stem member 434 integral to a guide member 426. The stem member 434 and longitudinal bore 435 serve to guide the disk member 440 during valve cycling.

Figure 6:
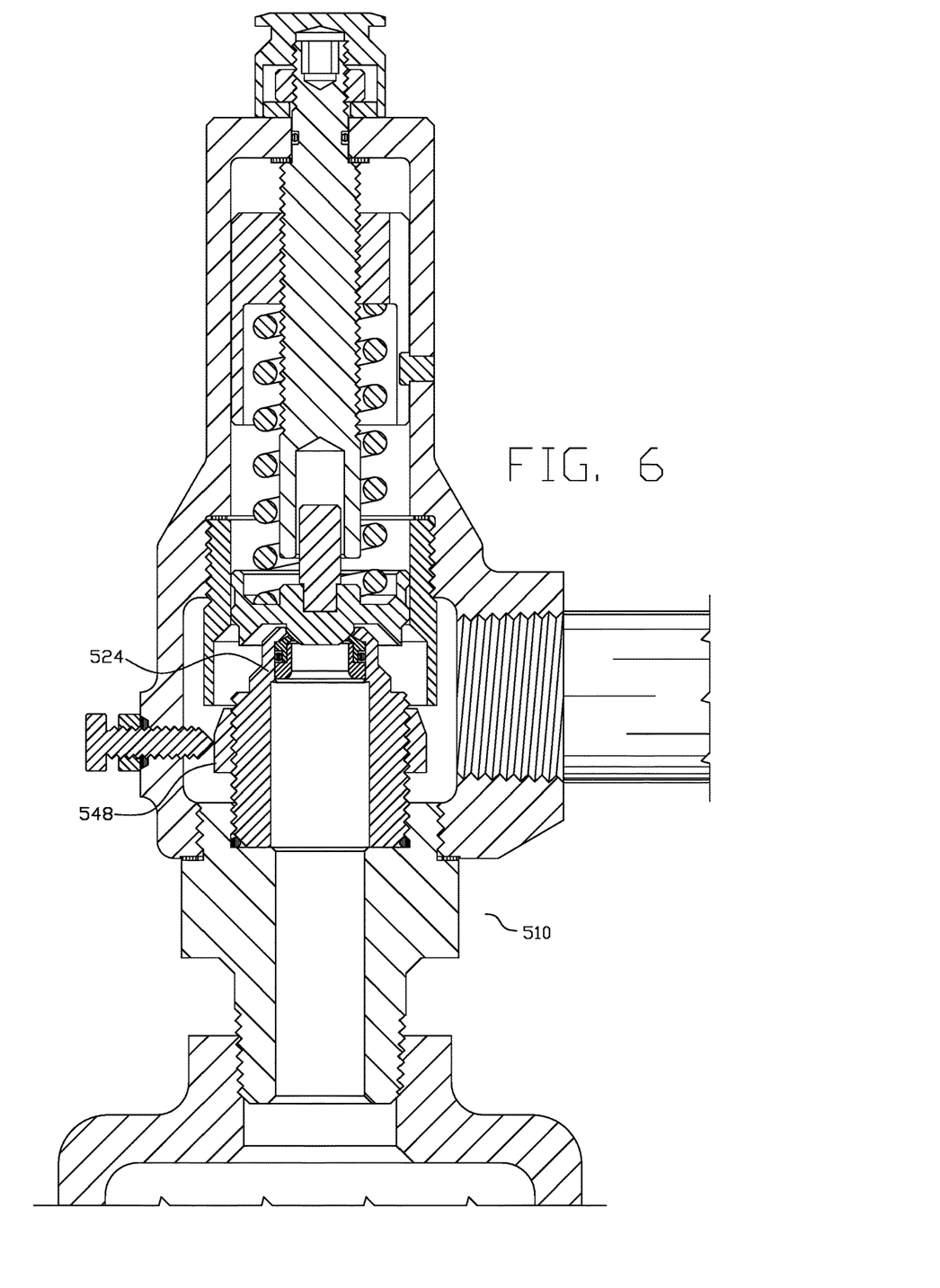
FIG. 6 is a cross-sectional view of a sixth embodiment of an adjustable blowdown safety valve in a closed position.

Referring to FIG. 6, another embodiment of an adjustable blowdown safety valve 510 is shown. The adjustable blowdown safety valve 510 is substantially identical to the adjustable blowdown safety valve 10 in FIG. 1, except the adjustable blowdown safety valve 510 utilizes a valve seat 524 with external threads for installation of a blowdown ring 548.

Figure 7:
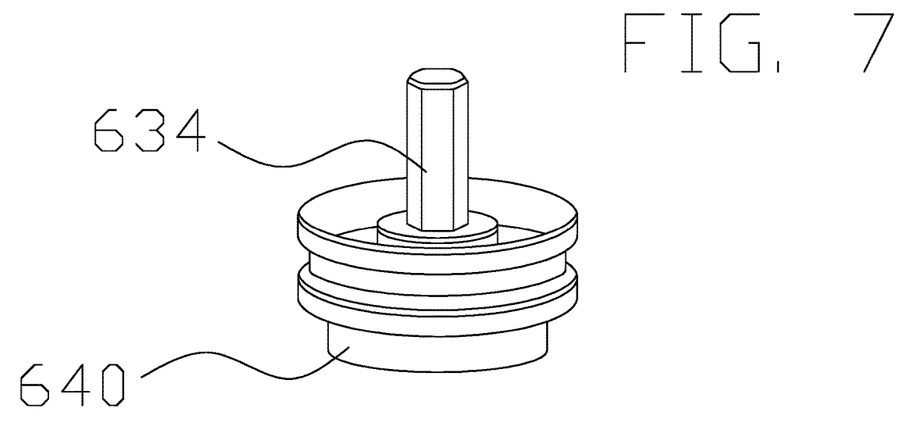
FIG. 7 is a side view of a hexagonal stem and round disk arrangement that can be used with any of the adjustable blowdown safety valves of FIG. 1-6.

Referring to FIG. 7, a hexagonal stem member 634 and a round disk member 640 arrangement is shown. This disk arrangement can be used with any of the adjustable blowdown safety valves of FIGS. 1-6.

Figure 8:
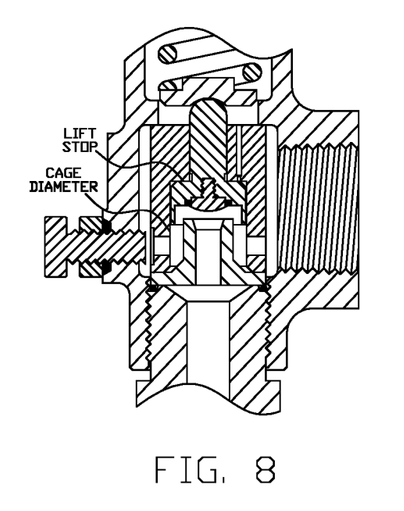
FIG. 8 and FIG. 9 is a cross-sectional view of prior art adjustable blowdown safety valves.
Figure 9:
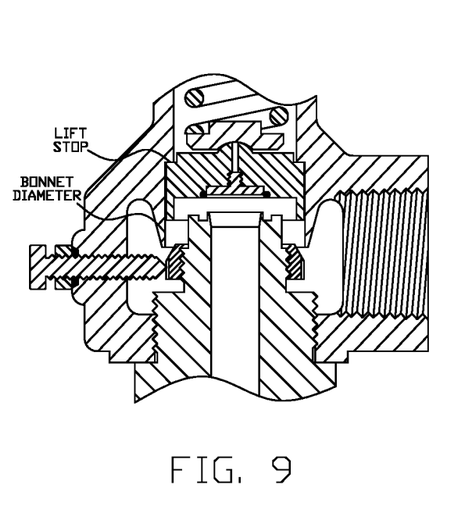

Referring to FIG. 8 and FIG. 9, shows a cross-sectional view of the '530 and '838 patents which constitute prior art.

It should be appreciated that the apparatus of the present invention is capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive, and the scope of the invention is therefore indicated by the appended claims rather than by the foregoing description. All changes that come within the meaning and range of equivalency of the claims are embraced to be within their scope.

The invention claimed is:

1. An adjustable blowdown safety valve comprising:
    a) a valve body with an inlet and an outlet;
    b) a valve seat positioned within said valve body between said inlet and said outlet;
    c) a disk member coacting with said valve seat to close said inlet and thereby shutoff communication between said inlet and said outlet, said disk member with a front side facing said valve seat and a back side;
    d) a resilient member urging said disk member into seated closure on said valve seat;
    e) said disk member being relatively movable responsive to said resilient member and to inlet pressure coacting on the front of said disk member;
    f) an annular fixed skirt member attached to said valve body surrounding said disk member with said inlet positioned at a height within said valve body, a distal end of said skirt member extending downwardly past said height of said inlet with an inner diameter of said skirt member partially overlapping an outer diameter of said inlet, such that said inner diameter of said skirt member and a ring define a flow area, disposed below said disk member, wherein said skirt member does not contact said inlet and said flow area is the sole communication to said outlet from said inlet past said valve seat and said disk member;
    g) said ring comprising a moveable obstruction to control the flow through said flow area thereby controlling pressure buildup in said valve body while said disk member is removed from said valve seat;
    h) said skirt member being spaced from said disk member to provide a restricted passage therebetween so that pressure on the back side of said disk member bleeds through said restricted passage creating a pressure force to close said disk member on said valve seat.

2. The adjustable blowdown safety valve of claim 1 wherein said resilient member comprises a spring being directly acted against by a guide member wherein said guide member provides a stop position for said disk member from said valve seat.

3. The adjustable blowdown safety valve of claim 1 wherein said resilient member comprises a spring being acted against, indirectly, by a guide member wherein said guide member provides a stop position for said disk member from said valve seat.

4. The adjustable blowdown safety valve of claim 3 further comprising a connecting means for connecting said guide member with said disk member such that said connecting means aligns said disk member with said inlet.

5. The adjustable blowdown safety valve of claim 4 wherein said guide member includes a longitudinal bore and said disk member includes a stem member, and said connecting means comprises said stem member slidably mounted within said longitudinal bore of said guide member.

6. An adjustable blowdown safety valve with an adjustable relief set pressure comprising a valve body with an inlet and an outlet, said valve body comprising a closed bonnet therein, a valve seat between said inlet and a disk member, and a spring acting on said disk member to force said disk member against said valve seat; said adjustable blowdown safety valve comprising:
    a) a guide member supported in said valve body to allow rotational, but not longitudinal movement of said guide member with respect to said valve body;
    b) a bushing member supported within said valve body to impart changes in compression of said spring by movement of said guide member;
    c) a fixed skirt member surrounding and concentric to said disk member, said skirt member having an inner diameter larger than and extending partially over an outer diameter of said inlet, wherein said skirt member does not contact said inlet, said skirt member defining a flow area in combination with a ring;
    d) said ring movably mounted to move toward and away from said skirt member to vary pressure buildup in said valve body after said disk member is removed from said valve seat;
    e) an annular passageway between said skirt member and said disk member whereby changes in pressure on a back side of said disk member are delayed in communication with a front side of said disk member thereby creating a pressure force coacting with said spring to close said disk member on said valve seat.

7. The adjustable blowdown safety valve of claim 6 further comprising a connecting means for connecting said guide member with said disk member, said connecting means and said spring providing the sole contact with said disk member to align said disk member with said inlet.

8. The adjustable blowdown safety valve of claim 7 wherein said guide member includes a longitudinal bore, and said connecting means comprises a stem member slidably mounted within the longitudinal bore of said guide member.

9. The adjustable blowdown safety valve of claim 8 wherein said spring comprises a helical spring and wherein said guide member fits within the annulus of said helical spring and has a diameter sufficiently close to an inside diameter of said helical spring to provide inside diameter guiding.

10. An adjustable blowdown safety valve designed for use on a pressure vessel or a flow line with a pressurized fluid therein, said adjustable blowdown safety valve comprising:
   a) a valve body with an inlet and an outlet;
   b) a valve seat between said inlet and a disk member;
   c) said disk member configured to seal off the flow of fluids through said adjustable blowdown safety valve at said valve seat;
   d) said disk member including a stem member;
   e) a spring acting on said disk member to force said disk member against said valve seat;
   f) a guide member rigidly supported in said valve body to allow rotational but not longitudinal movement of said guide member with respect to said valve body, said guide member including a longitudinal bore into which said stem member slidably fits so that said disk member is aligned with said inlet by a longitudinal sliding connection between said guide member and said stem member;
   g) said guide member providing an abutting surface which limits the lift of said disk member from said valve seat;
   h) a bushing member connected to said guide member and mounted within said valve body such that rotational movement of said guide member produces longitudinal movement of said bushing member with respect to said guide member, said bushing member also including a close sliding relationship with the inside walls of said valve body such that said bushing member provides centering of the lower portion of said guide member within said valve body;
   i) said spring comprising a helical spring biased between said bushing member and said disk member;
   j) said guide member fitting within the annulus of said helical spring with an outer diameter sufficiently close to an inside diameter of said helical spring to provide inside diameter guiding;
   k) a skirt member disposed within said valve body, wherein said skirt member does not contact said inlet, said skirt member being axially aligned with said disk member and said inlet, wherein a flow area is defined by an inner diameter of said skirt member and a ring, wherein said flow area is disposed beneath said disk member;
   l) said ring mounted on said inlet for adjustable height from said skirt member to control pressure buildup in said valve body after said disk member is removed from said valve seat, wherein said ring controls the blowdown of said adjustable blowdown safety valve;
   m) a fluid passageway between said skirt member and said disk member whereby changes in pressure on a back side of said disk member are delayed in time from reaching a front side of said disk member thereby creating a pressure closing force, which in cooperation with said spring tends to close said disk member on said valve seat.

* * * * *